United States Patent
Xue et al.

(10) Patent No.: US 10,530,895 B2
(45) Date of Patent: Jan. 7, 2020

(54) METHOD, SYSTEM AND SERVER FOR PUSHING INFORMATION

(71) Applicant: Tencent Technology (Shenzhen) Company Limited, Shenzhen (CN)

(72) Inventors: Di Xue, Shenzhen (CN); Zongbo Li, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 650 days.

(21) Appl. No.: 14/593,901

(22) Filed: Jan. 9, 2015

(65) Prior Publication Data
US 2015/0127724 A1   May 7, 2015

Related U.S. Application Data

(63) Continuation of application No. PCT/CN2013/077991, filed on Jun. 26, 2013.

(30) Foreign Application Priority Data

Jul. 11, 2012   (CN) .......................... 2012 1 0239165

(51) Int. Cl.
*H04L 29/06* (2006.01)
*H04L 12/58* (2006.01)

(52) U.S. Cl.
CPC .............. *H04L 67/42* (2013.01); *H04L 51/02* (2013.01)

(58) Field of Classification Search
CPC ......... H04L 67/26; H04L 51/20; H04L 67/18; H04L 67/42; H04L 51/02
See application file for complete search history.

(56) References Cited

U.S. PATENT DOCUMENTS 6,922,674 B1 * 7/2005 Nelson ................ G06Q 20/203
                                                            705/22
2009/0055485 A1   2/2009 Tsai et al.
(Continued)

FOREIGN PATENT DOCUMENTS

CA    2759923    12/2011
CN    1710856    12/2005
(Continued)

OTHER PUBLICATIONS

First Office Action (+Concise Explanation of Relevance) for CN Application No. 201210239165.5, dated Apr. 19, 2017, 11 pages.
(Continued)

*Primary Examiner* — Abdulkader M Alriyashi
(74) *Attorney, Agent, or Firm* — Brinks Gilson & Lione (57) ABSTRACT

A method, system and server for pushing information are disclosed in the embodiments of the present invention. In the method, corresponding to position information, the server presets contacts used for pushing information as communication robots. The method comprises: receiving, by the server, a nearby contact search request from a client, wherein the search request includes current position information of the client; searching the contacts nearby the current position included in the information; returning the searched contacts to the client, wherein the searched contacts includes communication robots; receiving, by the server, a query request from the client for querying the communication robots, obtaining recommendation information corresponding to the query request and pushing the recommendation information to the client.

14 Claims, 3 Drawing Sheets

--- a server receives a nearby contact search request from a client terminal, and the nearby contact search request includes information of a current location of the client terminal — 101 the server searches out at least one communication robot around the current location of the client terminal, and provides the at least one communication robot to the client terminal — 102 the server receives a query request for a communication robot from the client terminal, obtains recommendation information corresponding to the query request, and pushes the recommendation information to the client terminal — 103

(56) References Cited

U.S. PATENT DOCUMENTS

| | | | |
|---|---|---|---|
| 2009/0281966 A1* | 11/2009 | Biggs | G06F 17/30864 |
| | | | 706/11 |
| 2009/0307318 A1* | 12/2009 | Chappell | G06Q 10/109 |
| | | | 709/206 |
| 2010/0186069 A1 | 7/2010 | Liu | |
| 2010/0332495 A1* | 12/2010 | Richter | G06F 16/2477 |
| | | | 707/759 |
| 2011/0060480 A1 | 3/2011 | Mottla et al. | |
| 2011/0241882 A1* | 10/2011 | Gonzales | G06Q 30/0281 |
| | | | 340/572.1 |

FOREIGN PATENT DOCUMENTS

| | | |
|---|---|---|
| CN | 101141270 | 3/2008 |
| CN | 101178718 | 5/2008 |
| CN | 101374120 A | 2/2009 |
| CN | 101621742 | 1/2010 |
| CN | 101902503 | 12/2010 |

OTHER PUBLICATIONS

Second Office Action in Canadian Application No. 2,878,193, dated Mar. 30, 2017, 4 pages.
International Preliminary Report on Patentability for International Application No. PCT/CN2013/077991, dated Jan. 22, 2015.
International Search Report for International Application No. PCT/CN2013/077991, dated Oct. 10, 2013, 6 pages.
Second Office Action (+Concise Explanation of Relevance) for Chinese Patent Application No. 201210239165.5, 8 pgs., (dated Jan. 3, 2018).

* cited by examiner

METHOD, SYSTEM AND SERVER FOR PUSHING INFORMATION

CROSS-REFERENCE TO RELATED APPLICATIONS

This application is a continuation of International Application No. PCT/CN2013/077991, filed on Jun. 26, 2013. This application claims the benefit of priority of Chinese Patent Application No. 201210239165.5, entitled "Method, System and Server for Pushing Information," filed on Jul. 11, 2012. The disclosures of each of the above applications are incorporated herein by reference in their entirety for all purposes.

TECHNICAL FIELD

The present disclosure relates to information processing technologies, and more particularly, to a method, system and server for pushing information.

BACKGROUND

Currently, various modes for pushing information are used, e.g. a system-message mode, a tip-prompting mode, a short-message mode and etc. The conventional modes for pushing information are described as following.

In the system-message mode, when communication is performed by using an Instant Messenger (IM) client, a system message is sent from a network side to the IM client. The system message includes recommendation information to be pushed to a user of the IM client or a Uniform Resource Locator (URL) of the recommendation information. The IM client may obtain the recommendation information according to the system message. The IM client may be, e.g. a QQ client, or a MSN client.

In the tip-prompting mode, when a user browses a web page via a user terminal, a tip is sent by the network side to the user terminal, and the tip may be displayed on a current page of the user terminal. The tip includes the recommendation information to be pushed to the user terminal or the URL of the recommendation information.

In the short-message mode, a short message is sent to all possible user terminals from the network side. The short message includes the recommendation information to be pushed to the user terminal or the URL of the recommendation information.

The recommendation information may include bulletin information and information to be popularized, and etc. In conventional solutions for pushing information, the recommendation information is sent to all users, and target users cannot be selected from all users. Therefore, the information pushing does not have pertinence, other users who are not the target users are disturbed, and system resources are wasted.

Along with the developments of information communication technologies, the information pushing becomes increasing related to a specific area. If the information is pushed to the target users based on location information, other users who are not the target users may not receive the information, and the system resources are saved. However, the related technologies are not provided currently.

SUMMARY

The embodiments of the present disclosure provides a method, system and server for pushing information, so that information is pushed to target clients without annoying other clients, and system resources are saved.

A method for pushing information, wherein a server preconfigures a contact corresponding to at least one item of location information as a communication robot, includes:

receiving, by the server, a nearby contact search request from a client terminal; the nearby contact search request including information of a current location of the client terminal; searching for at least one communication robot around the current location of the client terminal, and providing the at least one communication robot to the client terminal;

receiving, by the server, a query request for one communication robot of the at least one communication robot from the client terminal, obtaining recommendation information corresponding to the query request, and pushing the recommendation information to the client terminal.

A server for pushing information includes storage and a processor communicating with the storage, wherein the storage stores instructions which may be executed by the processor and the instructions include:

a contact information instruction, to obtain location information of contacts in real time, store a relationship between the location information and the contacts;

a robot information managing instruction, to configure a contact corresponding to at least one item of location information as a communication robot;

a contact search instruction, to receive a nearby contact search request from a client terminal, the nearby contact search request including information of a current location of the client terminal; search for at least one communication robot around the current location, provide the at least one communication robot to the client terminal; and an interaction logic instruction, to receive a query request for one communication robot of the at least one communication robot from the client terminal, obtain recommendation information corresponding to the query request, and send the recommendation information to the client terminal.

A system for pushing information includes a client terminal and a server, wherein the server is to preconfigure a contact corresponding to at least one item of location information as a communication robot; the server is to receive a nearby contact search request from the client terminal, the nearby contact search request including information of a current location of the client terminal; search for at least one communication robot around the current location of the client terminal; and provide the at least one communication robot to the client terminal; the server is to receive a query request for one communication robot of the at least one communication robot from the client terminal, obtain recommendation information corresponding to the query request, and send the recommendation information to the client terminal; and the client terminal is to send the nearby contact search request to the server; receive the at least one communication robot from the server; send the query request for one communication robot of the at least one communication robot; and receive the recommendation information from the server.

A computer readable storage medium includes computer program codes, which, when executed by a computer, will cause the computer to perform the above method.

As can be seen, in the embodiments of the present disclosure, the communication robot which corresponds to the location information and is used for pushing information is preconfigured. After receiving the nearby contact search request including information of the current location of the client terminal from the client terminal, the server sends information of the communication robots around the current location to the client terminal. Further, the server sends the recommendation information to the client terminal according to the query request for the communication robot from the client terminal. Therefore, the recommendation information is pushed to the client terminals located around the location of the communication robot, so that the information is pushed to target clients without annoying other clients, and thus system resources are saved.

DETAILED DESCRIPTION

In order to make the object, technical solution and merits of the present disclosure clearer, the present disclosure will be illustrated in detail hereinafter with reference to the accompanying drawings and specific embodiments.

Currently, a terminal device always has a location function, and a client terminal implemented by an application running on the terminal device may use a Location Based Service (LBS).

In the embodiments of the present disclosure, information is pushed based on the LBS, and the LBS may provide information of contacts located near a current location of the terminal device for a user of the terminal device. For example, the LBS may provide a function of finding nearby contacts for the user.

At least one contact for pushing information is preconfigured in a server. In the embodiments of the present disclosure, the contact for pushing information is called a communication robot, or a Chat Robot (CB). The server in the embodiments of the present disclosure is able to provide LBS for users.

Figure 1:
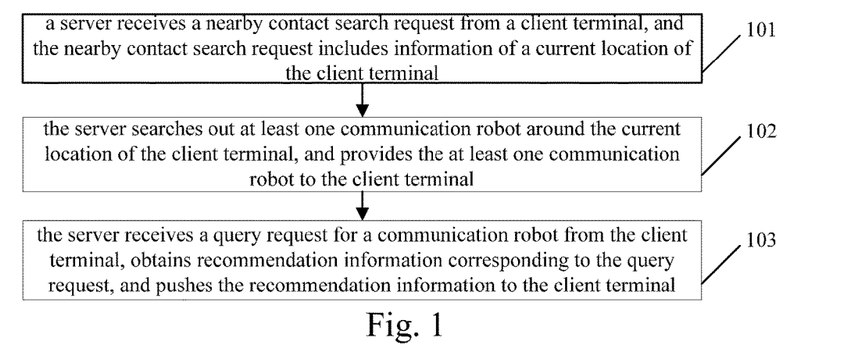
FIG. 1 is a schematic flowchart illustrating a method for pushing information according to various embodiments of the present disclosure.

FIG. 1 is a schematic flowchart illustrating a method for pushing information according to various embodiments of the present disclosure. As shown in FIG. 1, the method includes the following processing.

At 101, a server receives a nearby contact search request from a client terminal, and the nearby contact search request includes information of a current location of the client terminal.

At 102, the server searches out at least one communication robot around the current location of the client terminal, and provides the at least one communication robot to the client terminal.

In an embodiment, the communication robot may be a virtual account. When the client terminal searches for nearby contacts, the server may provide the communication robot around the current location of the client terminal by sending a nearby contact list including the communication robot to the client terminal.

In an embodiment, the nearby contact search request sent by the client terminal may be a communication robot search request. Correspondingly, the server may directly send the client terminal a list including communication robots around the current location of the client terminal.

When the communication robot is preconfigured, search condition may be configured for the communication robot. In an embodiment, the search condition may be an effective range, and the following mode may be used when the server searches for communication robots around the current location of the client terminal.

The server determines a target area. The target area may be a circle area. The center of the circle area is the current location of the client terminal and the radius of the circle area is a preset distance. In an embodiment, the preset distance may 3 kilometers.

The server searches for all communication robots located within the target area, and determines the effective range of each communication robot. In an embodiment, the effective range is 500 meters, that is, the center of the effective range is a location of the communication robot and the radius of the effective range is 500 meters.

The server removes the communication robot not satisfying the search condition. In an embodiment, the server determines whether the current location of the client terminal is within the effective range of the communication robot. If the current location of the client terminal is within the effective range of the communication robot, the communication robot is determined as the communication robot around the current location of the client terminal. In an embodiment, the search condition of the communication robot may be configured according to requirements. Besides the effective range, the search condition may include a period of validity. When the search condition of the communication robot is the period of validity, the server may determine whether the current time is within the period of validity. If the current time is within the period of validity, the communication robot is determined as the communication robot around the current location of the client terminal.

At 103, the server receives a query request for a communication robot from the client terminal, obtains recommendation information corresponding to the query request, and pushes the recommendation information to the client terminal.

In an embodiment, after receiving the nearby contact list, the client terminal selects one communication robot and sends a query request for the selected communication robot. The query request includes at least an identity of the communication robot, e.g. an account.

In an embodiment, the communication robot may send recommendation information to the client terminal corresponding to different types of query requests.

In an embodiment, the server may preconfigure the communication robot as a communication robot corresponding to query requests of an auto-response type. The server may store a relationship between the query requests and items of the recommendation information in advance. The communication robot is able to respond the query requests included in the relationship. After receiving the query request, the server searches the stored relationship between the query requests and the items of the recommendation information for the recommendation information corresponding to the received query request, according to the identity of the communication robot included in the query request and contents of the query request.

In an embodiment, the server may preconfigure the communication robot as a communication robot corresponding to query requests of a short-term information type. The server may develop and generate a new page by using specific page logic so as to update short-term information in time. The recommendation information corresponding to the query request of the short-term information type is an information link address of a page. After receiving the query request, the server searches out an information link address corresponding to the identity of the communication robot included in the query request, and the server takes the information link address as the recommendation information. After sending the recommendation information to the client terminal, the client terminal obtains a web page corresponding to the information link address from the network side and displays the web page.

In an embodiment, the server may preconfigure the communication robot as a communication robot corresponding to query requests of a real-time information type. After receiving the query request, the server sends the received query request to a predetermined client terminal or server according to the identity of the communication robot included in the query request and contents of the query request, and then receives recommendation information sent by the predetermined client terminal or server, and takes the received recommendation information as the recommendation information corresponding to the query request.

In an embodiment, the query request may be sent as text data or as voice data. The recommendation information may be sent as text data, voice data or video data.

In an embodiment, after the recommendation information is sent to the client terminal, the server may automatically send recommendation information related to the communication robot to the client terminal.

In an embodiment, the recommendation information may be bulletin information, information to be popularized and etc.

Figure 2:
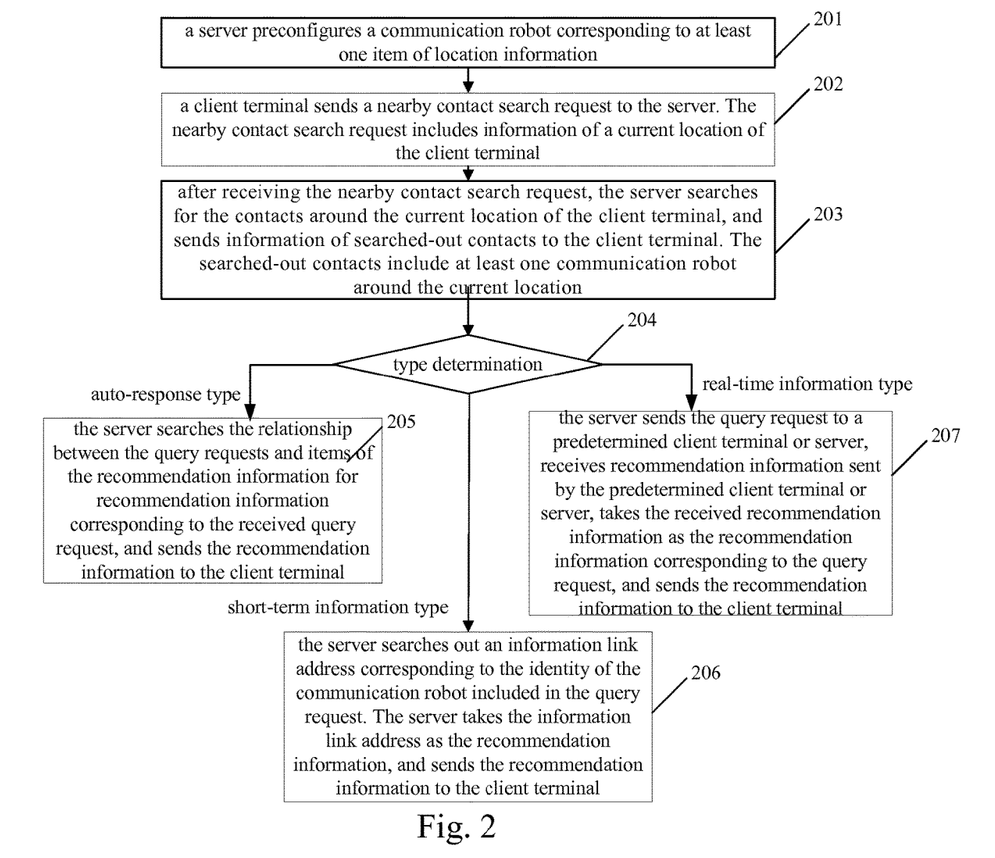
FIG. 2 is a schematic flowchart illustrating a method for pushing information according to various embodiments of the present disclosure.

FIG. 2 is a schematic flowchart illustrating a method for pushing information according to various embodiments of the present disclosure. As shown in FIG. 2, the method includes the following processing.

At 201, a server preconfigures a communication robot corresponding to at least one item of location information. In the embodiment, the communication robot is used to push information.

If the communication robot corresponds to query requests of an auto-response type, the server pre-stores a relationship between the query requests and items of recommendation information. In an embodiment, the communication robot corresponding to the query requests of the auto-response type is to push long-term information which may include information of a business hall or a gas station. Because the location of the business hall or the gas station is fixed, the information to be pushed is unchanged for a long time. The long-term information may include addresses, telephones and etc.

If the communication robot corresponds to query requests of a short-term information type, the server pre-stores an information link address of short-term information corresponding to an identity of the communication robot. For example, the short-term information may be an activity of sharing gifts with friends on Christmas day. Users may access a web page according to the information link address of the short-term information, select a friend, and give flowers to the selected friend.

At 202, a client terminal sends a nearby contact search request to the server. The nearby contact search request includes information of a current location of the client terminal.

In embodiments, the client terminal may be a client terminal providing the LBS, e.g. a QQ client. The LBS may be a function of searching for nearby contacts, and contacts around the current location of the client terminal may be searched out by using the LBS, so that the client terminal may interact with the nearby contacts. The nearby contacts may be strangers or friends of the user using the client terminal.

At 203, after receiving the nearby contact search request, the server searches for the contacts around the current location of the client terminal, and sends information of searched-out contacts to the client terminal. The searched-out contacts include at least one communication robot around the current location.

At 204, the server receives a query request for the communication robot from the client terminal, and determines a type of the query request according to an identity of the communication robot included in the query request and contents of the query request. If the type of the query request is an auto-response type, processing at 205 is performed. If the type of the query request is a short-term information type, processing at 206 is performed. If the type of the query request is a real-time information type, processing at 207 is performed.

If the type of the query request is the real-time information type, the query request may be sent to the server as voice data.

At 205, the server searches the relationship between the query requests and items of the recommendation information for recommendation information corresponding to the received query request, and sends the recommendation information to the client terminal.

At 206, the server searches out an information link address corresponding to the identity of the communication robot included in the query request. The server takes the information link address as the recommendation information, and sends the recommendation information to the client terminal.

At 207, the server sends the query request to a predetermined client terminal or server, receives recommendation information sent by the predetermined client terminal or server, takes the received recommendation information as the recommendation information corresponding to the query request, and sends the recommendation information to the client terminal. The recommendation information may be pushed to the client terminal as voice data or audio data.

As can be seen, in the embodiments of the present disclosure, the communication robot which corresponds to the location information and is used for pushing information is preconfigured. After receiving the nearby contact search request including information of the current location of the client terminal from the client terminal, the server sends information of the communication robots around the current location to the client terminal. Further, the server sends the recommendation information to the client terminal according to the query request for the communication robot from the client terminal. Therefore, the recommendation information is pushed to the client terminals located around the location of the communication robot, so that the information is pushed to target clients without annoying other clients, and thus system resources are saved.

Figure 3:
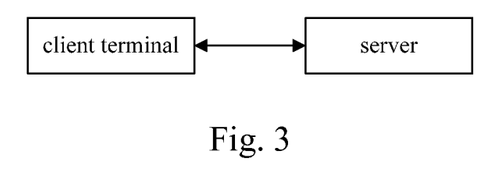
FIG. 3 is a schematic diagram illustrating a system for pushing information according to various embodiments of the present disclosure.

FIG. 3 is a schematic diagram illustrating a system for pushing information according to various embodiments of the present disclosure. As shown in FIG. 3, the system includes a client terminal and a server.

The server preconfigures a contact corresponding to at least one item of location information as a communication robot. The server further receives a nearby contact search request from the client terminal, and the nearby contact search request includes information of a current location of the client terminal. The server searches out contacts around the current location of the client terminal, and provides information of the searched-out contacts to the client terminal. The searched-out contacts includes at least one communication robot. The server further receives a query request for the communication robot from the client terminal, obtains recommendation information corresponding to the query request, and sends the recommendation information to the client terminal.

The client terminal sends the nearby contact search request to the server, and receives the information of the contacts from the server. The contacts include at least one communication robot. The client terminal further sends the query request for at least one communication robot and receives the recommendation information from the server.

Figure 4:
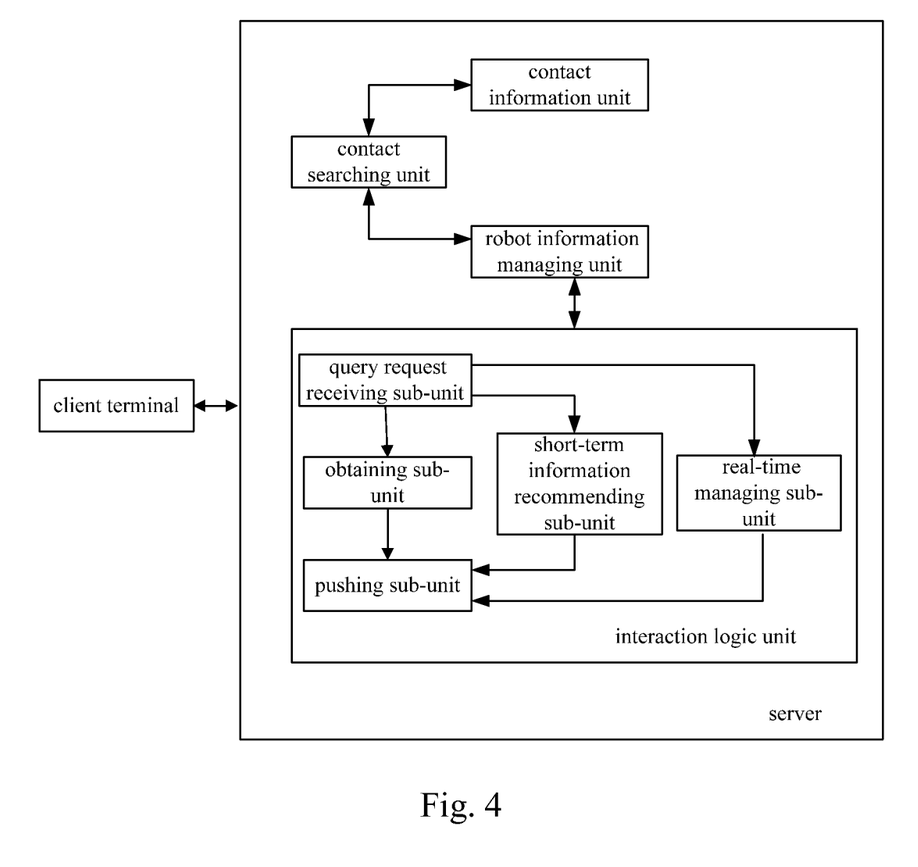
FIG. 4 is a schematic diagram illustrating a server for pushing information according to various embodiments of the present disclosure.

FIG. 4 is a schematic diagram illustrating a server for pushing information according to various embodiments of the present disclosure. As shown in FIG. 4, the server includes a contact information unit, a robot information managing unit, a contact searching unit and an interaction logic unit.

The contact information unit is to obtain location information of contacts in real time, stores a relationship between the location information and the contacts.

The robot information managing unit is to configure a contact corresponding to at least one item of location information as a communication robot, and the communication robot is used to push information.

The contact searching unit is to receive a nearby contact search request from a client terminal, and the nearby contact search request includes information of a current location of the client terminal. The contact searching unit is further to search for contacts around the current location from the contact information unit and the robot information managing unit, send the searched-out contacts to the client terminal. The searched-out contacts include at least one communication robot.

The interaction logic unit is to receive a query request for the communication robot from the client terminal, obtain recommendation information corresponding to the query request, and send the recommendation information to the client terminal.

The interaction logic unit is mainly used to configure and store interaction logic and contents. When the user communicates with the communication robot, the interaction logic unit performs response or some operations according to predetermined interaction logic. For example, the interaction logic configured for a certain communication robot may include: "if a user greets the communication robot, e.g. the query request is "hi", "hello" and etc., the communication robot responds with "hello"; or "the communication robot is A gas station, and if the query request is an address query request, e.g. the query request includes "where", "address" and etc., the communication robot sends address information of the A gas station to the user"; or "if the interaction logic unit learns that the user uses a QQ video function during the communication process, the interaction logic unit prompts the user to join a lottery and sends an address of the lottery web page".

In an embodiment, when the type of the query request is the auto-response type, the robot information managing unit is further to store a relationship between the query requests and items of the recommendation information, the interaction logic unit includes a query request receiving sub-unit, an obtaining sub-unit and a pushing sub-unit.

The query request receiving sub-unit is to receive the query request for the communication robot from the client terminal, and send the query request to the obtaining sub-unit after determining the type of the query request is the auto-response type.

The obtaining sub-unit is to receive the query request, search the robot information managing unit for the recommendation information corresponding to the query request, and send the recommendation information to the pushing sub-unit.

The pushing sub-unit is to push the received recommendation information to the client terminal.

In an embodiment, the robot information managing unit is used to obtain and store attribute information of the communication robot. The attribute information includes at least one of a name, a text introduction, a picture, location information (e.g. latitude and longitude, province, city, district), an effective range (e.g. 3 kilometers around the current location), and information to be responded automatically, i.e. the relationship between the query requests and the recommendation information. The attribute information of the communication robot may be stored as a list, and the list is called a robot list. The attribute information of multiple communication robots may be stored in one robot list, and the name of the communication robot may be used as an index. The robot information managing unit is further to provide an interface for external to search the robot list according to a designated condition. The designated condition may be a location range. The communication robot satisfying the designated condition may be obtained via the interface.

In an embodiment, when the type of the query request is the short-term information type, the interaction logic unit further includes a short-term information recommending sub-unit.

The query request receiving sub-unit is further to send the query request to the short-term information recommending sub-unit after determining the type of the query request is the short-term information type.

The short-term information recommending sub-unit is to store a relationship between the identities of the communication robots and the information link addresses of the short-term information. After receiving the query request, the short-term information recommending sub-unit is to search out an information link address corresponding to the identity of the communication robot included in the query request, take the information link address as the recommendation information, and send the recommendation information to the pushing sub-unit.

In an embodiment, the short-term information recommending sub-unit is used to push traditional recommendation information, e.g. information which cannot be pushed after obtained by the obtaining sub-unit because of some special requirements. The communication robot may be used as an entrance of an activity which leads users to the activity. For example, the short-term activity may be an activity of sharing gifts with friends on Christmas day. The user may access a web page according to the information link address, select a friend, and give flowers to the selected friend.

In an embodiment, when the type of the query request is the real-time information type, the server further includes a real-time managing sub-unit.

The query request receiving sub-unit is further to send the query request to the real-time managing sub-unit after determining the type of the query request is the real-time information type.

The real-time managing sub-unit is to send the query request to a predetermined client terminal or server, receive recommendation information from the predetermined client terminal or server, and take the received recommendation information as the recommendation information corresponding to the query request.

In an embodiment, the real-time managing sub-unit is used to push real-time information. For example, the real-time information may be traffic information and the query request is to inquire traffic information of a certain road. After receiving the query request, the real-time managing sub-unit sends the query request to users around the road or to a traffic condition server of the road. After receiving the traffic information of the road, the real-time managing sub-unit sends the traffic information to the client terminal sending the query request. The query request may be sent as text data, voice data, and the recommendation information may be sent as text data, voice data or video data. Besides the traffic information, the real-time managing sub-unit may push other real-time information, e.g. taxi information of a certain range. Managers of the communication robot or merchants using the communication robot to popularize activities may check the query requests of the users by using the real-time managing sub-unit and may reply some query requests.

There are various reasons of pushing information, e.g. bulletin information, celebration information, brand promotion, external cooperation and etc. The information has strong regional character (e.g. province, city, or region, a range within 3 kilometers), especially when the information is related to local life, e.g. when the information is related to telecommunication operation, gas stations, car rental, chain supermarket and etc., the regional character is more strong. It is necessary to identify the locations of the users, and the information is only pushed to the users within the designated location range, so that targeted pushing is performed, and utilization rate of resources and activities effect are improved.

According to the embodiments of the present disclosure, the location function and LBS provided by the user terminal device are fully used to determine the target users, thereby improving activities effect and reducing disturbing for other users. In addition, the communication robot has flexible configurations and various functions. Besides simple reply, service logic may be included, and when the requirements are complicated, the communication robot may be used as an interface which may lead the users to receive conventional information. Moreover, the communication robot may be used as a long-term life service based on the fixed location, limited cover range, and configurable interaction logic. When no activity is performed, the communication robot may push daily information, e.g. introduction of the business hall, current price of oil and etc. Compared with conventional modes for pushing information, the communication robot is free, more flexible and effective, and may be added or cancelled as required, therefore, cost is saved and efficiency is improved.

Figure 5:
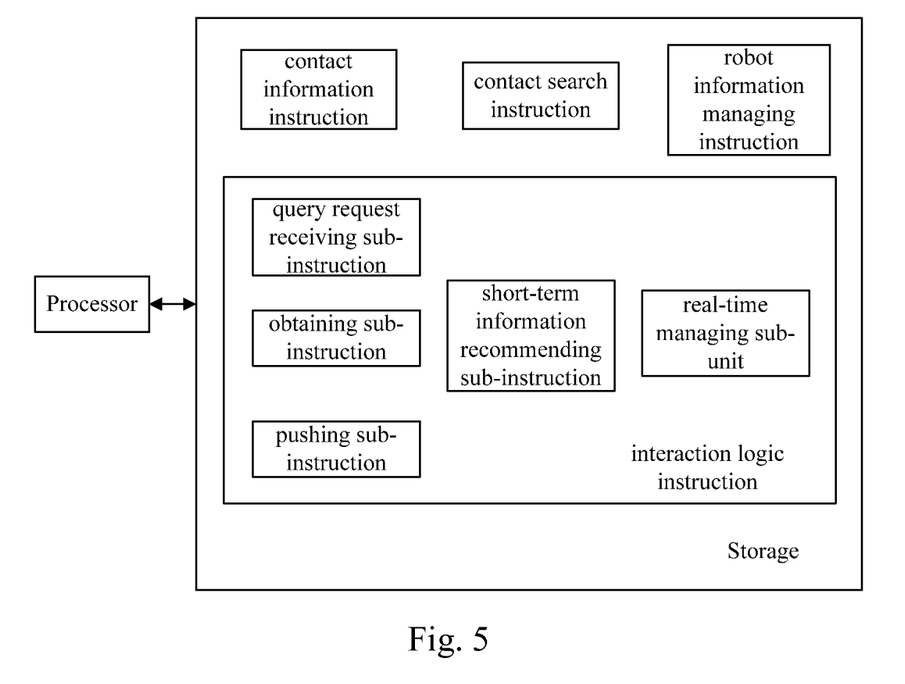
FIG. 5 is a schematic diagram illustrating a server for pushing information according to various embodiments of the present disclosure.

FIG. 5 is a schematic diagram illustrating a server for pushing information according to various embodiments of the present disclosure. As shown in FIG. 5, the server at least includes storage and a processor. The processor may communicate with the storage. The storage stores instructions which may be executed by the processor. The instructions include a contact information instruction, a robot information managing instruction, a contact search instruction and an interaction logic instruction.

The contact information instruction is to obtain location information of contacts in real time, store a relationship between the location information and the contacts.

The robot information managing instruction is to configure a contact corresponding to at least one item of location information as a communication robot.

The contact searching instruction is to receive a nearby contact search request from a client terminal, and the nearby contact search request includes information of a current location of the client terminal. The contact searching instruction is further to search for at least one communication robot around the current location, send the searched-out communication robot to the client terminal.

The interaction logic instruction is to receive a query request for one communication robot of the at least one communication robot from the client terminal, obtain recommendation information corresponding to the query request, and send the recommendation information to the client terminal.

In an embodiment, when the type of the query request is the auto-response type, the robot information managing instruction is further to store a relationship between the query requests and items of the recommendation information. The interaction logic instruction includes a query request receiving sub-instruction, an obtaining sub-instruction and a pushing sub-instruction.

The query request receiving sub-instruction is to receive the query request for the communication robot of the at least one communication robot from the client terminal, and determine the type of the query request is the auto-response type.

The obtaining sub-instruction is to search for the recommendation information corresponding to the query request.

The pushing sub-instruction is to push the recommendation information corresponding to the query request of the auto-response type to the client terminal.

In an embodiment, when the type of the query request is the short-term information type, the interaction logic instruction includes a query request receiving sub-instruction, a short-term information recommending sub-instruction, and a pushing sub-instruction.

The query request receiving sub-instruction is to receive the query request for the communication robot of the at least one communication robot from the client terminal, and determine the type of the query request is the short-term information type.

The short-term information recommending sub-instruction is to store a relationship between the identities of the communication robots and the information link addresses of the short-term information, search for an information link address corresponding to the identity of the communication robot included in the query request, take the searched-out information link address as the recommendation information corresponding to the query request.

The pushing sub-instruction is to push the recommendation information corresponding to the query request to the client terminal.

In an embodiment, when the type of the query request is the real-time information type, the interaction logic instruction includes a query request receiving sub-instruction, a real-time managing sub-unit, and a pushing sub-instruction.

The query request receiving sub-instruction is to receive the query request for the communication robot of the at least one communication robot from the client terminal, and determine the type of the query request is the real-time information type.

The real-time managing sub-instruction is to send the query request to a predetermined client terminal or server, receive recommendation information from the predetermined client terminal or server, and take the received recommendation information as the recommendation information corresponding to the query request.

The pushing sub-instruction is to push the recommendation information corresponding to the query request to the client terminal.

As can be seen, in the embodiments of the present disclosure, the communication robot which corresponds to the location information and is used for pushing information is preconfigured. After receiving the nearby contact search request including information of the current location of the client terminal from the client terminal, the server sends information of the communication robots around the current location to the client terminal. Further, the server sends the recommendation information to the client terminal according to the query request for the communication robot from the client terminal. Therefore, the recommendation information is pushed to the client terminals located around the location of the communication robot, so that the information is pushed to target clients without annoying other clients, and thus system resources are saved.

The methods, modules and devices described herein may be implemented by hardware, machine-readable instructions or a combination of hardware and machine-readable instructions. Machine-readable instructions used in the embodiments disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

The embodiments of the present disclosure provide a machine-readable storage medium which is to store instructions to cause a machine to execute a method as described herein.

Specifically, a system or apparatus having a storage medium that stores machine-readable program codes for implementing functions of any of the above embodiments and that may make the system or the apparatus (or CPU or MPU) read and execute the program codes stored in the storage medium.

In this situation, the program codes read from the storage medium may implement any one of the above embodiments, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above embodiments.

In addition, the program codes implemented from a storage medium are written in a storage in an extension board inserted in the computer or in a storage in an extension unit connected to the computer. In this embodiment, a CPU in the extension board or the extension unit executes at least part of the operations according to the instructions based on the program codes to realize a technical scheme of any of the above embodiments.

Although described specifically throughout the entirety of the instant disclosure, representative embodiments of the present disclosure have utility over a wide range of applications, and the above discussion is not intended and should not be construed to be limiting, but is offered as an illustrative discussion of aspects of the disclosure.

The invention claimed is:

1. A method for pushing information implemented by a server including a storage and a processor communicating with the storage, the method comprising:
preconfiguring, by the server, a first communication robot as a contact with a virtual account, including preconfiguring attribute information of the first communication robot to include an assigned location of the first communication robot and an effective range of the first communication robot comprising a radius of a preset value, the first communication robot configured to interact with a client terminal;
receiving, by the server, a nearby contact search request from the client terminal, the nearby contact search request including information of a current location of the client terminal, which is obtained using a Location Based Service (LBS), and comprising a request for a list of nearby contacts comprising friends of a user of the client terminal;
searching, by the server, for at least one communication robot within a target area, the target area corresponding to the current location of the client terminal, and providing a contact list including at least one friend of the user of the client terminal and the at least one communication robot to the client terminal, the at least one communication robot including the first communication robot;
receiving, by the server, a query request for the first communication robot from the client terminal, the query request comprising an interaction with the first communication robot in a chat setting, the first communication robot being selected from the contact list by the user of the client terminal for interaction;
obtaining, by the server, recommendation information corresponding to the query request; and
pushing, by the server, the recommendation information to the client terminal;
wherein searching for at least one communication robot around the current location of the client terminal includes:
searching for, by the server, all communication robots within the target area, and determining the effective range of the first communication robot of the communication robots within the target area;
determining that the current location of the client terminal is within the effective range of the first communication robot; and
in response to determining that the current location of the client terminal is within the effective range of the first communication robot, determining the first communication robot as one of the at least one communication robot.

2. The method of claim 1, wherein a type of the query request is an auto-response type; and
obtaining the recommendation information corresponding to the query request comprises:
searching a preconfigured relationship between query requests and items of recommendation information for the recommendation information corresponding to the query request.

3. The method of claim 1, wherein a type of the query request is a short-term information type; and
obtaining the recommendation information corresponding to the query request comprises:
according to an identity of the communication robot in the query request, searching a preconfigured relationship between identities of communication robots and information link addresses of short-term information for an information link address corresponding to the identity of the communication robot; taking the information link address as the recommendation information corresponding to the query request.

4. The method of claim 3, further comprising:
obtaining, by the client terminal, a web page corresponding to the information link address from a network side; and displaying the web page.

5. The method of claim 1, wherein a type of the query request is a real-time information type; and
obtaining the recommendation information corresponding to the query request comprises:
sending the query request to a preconfigured client terminal or server, receiving recommendation information sent by the preconfigured client terminal or server, and taking the received recommendation information as the recommendation information corresponding to the query request.

6. A server for pushing information, comprising storage and a processor communicating with the storage, the storage storing instructions which may be executed by the processor, the instructions comprising:
a contact information instruction, to obtain location information of contacts of a user of a client terminal in real time, store a relationship between the location information and the contacts;
a robot information managing instruction, to configure a contact including a virtual account corresponding to at least one item of location information as a communication robot;
a contact search instruction, to receive a nearby contact search request from a client terminal, the nearby contact search request including information of a current location of the client terminal, which is obtained using a Location Based Service (LBS), and comprising a request for a list of nearby contacts comprising friends of a user of the client terminal; search for at least one communication robot around the current location, provide a contact list including at least one friend of the user of the client terminal and the at least one communication robot to the client terminal;
an interaction logic instruction, to receive a query request for one communication robot of the at least one communication robot from the client terminal, the query request comprising an interaction with the first communication robot in a chat setting, the first communication robot being selected from the contact list by the user of the client terminal for interaction, obtain recommendation information corresponding to the query request, and send the recommendation information to the client terminal;
wherein the at least one communication robot around the current location of the client terminal is searched by determining a target area; a center of the target area being the current location of the client terminal and a radius of the target area being a preset distance; searching for all communication robots within the target area, and determining an effective range of a first communication robot of the communication robots within the target area; determining whether the current location of the client terminal is within the effective range of the first communication robot; determining whether a current time is within a period of validity of the first communication robot; if the current location of the client terminal is within the effective range of the first communication robot, and the current time is within the period of validity of the first communication robot, determining the first communication robot as the communication robot around the current location of the client terminal; wherein a center of the effective range of the first communication robot is a location of the first communication robot and a radius of the effective range of the first communication robot is a preset value.

7. The server of claim 6, wherein a type of the query request is an auto-response type; and
the robot information managing instruction is further to store a relationship between the query requests and items of recommendation information; the interaction logic instruction comprises a query request receiving sub-instruction, an obtaining sub-instruction and a pushing sub-instruction;
the query request receiving sub-instruction is to receive the query request for the communication robot of the at least one communication robot from the client terminal, and determine the type of the query request is the auto-response type;
the obtaining sub-instruction is to search for the recommendation information corresponding to the query request;
the pushing sub-instruction is to push the recommendation information corresponding to the query request of the auto-response type to the client terminal.

8. The server of claim 6, wherein a type of the query request is a short-term information type, the interaction logic instruction comprises a query request receiving sub-instruction, a short-term information recommending sub-instruction, and a pushing sub-instruction;
the query request receiving sub-instruction is to receive the query request for the communication robot of the at least one communication robot from the client terminal, and determine the type of the query request is the short-term information type;
the short-term information recommending sub-instruction is to store a relationship between identities of communication robots and information link addresses of short-term information, search for an information link address corresponding to an identity of the communication robot in the query request, take the information link address as the recommendation information corresponding to the query request;
the pushing sub-instruction is to push the recommendation information corresponding to the query request to the client terminal.

9. The server of claim 6, wherein a type of the query request is a real-time information type; and the interaction logic instruction comprises a query request receiving sub-instruction, a real-time managing sub-unit, and a pushing sub-instruction;

the query request receiving sub-instruction is to receive the query request for the communication robot of the at least one communication robot from the client terminal, and determine the type of the query request is the real-time information type;

the real-time managing sub-instruction is to send the query request to a predetermined client terminal or server, receive recommendation information from the predetermined client terminal or server, and take the received recommendation information as the recommendation information corresponding to the query request;

the pushing sub-instruction is to push the recommendation information corresponding to the query request to the client terminal.

10. A non-transitory computer readable storage medium, comprising computer program codes, which, when executed by a computer at a server side, will cause the computer to perform the following processes:

preconfiguring a first communication robot as a contact with a virtual account, including preconfiguring attribute information of a first communication robot to include an assigned location of the first communication robot and an effective range of the first communication robot comprising a radius of a preset value, the first communication robot configured to interact with a client terminal;

receiving a nearby contact search request from the client terminal, the nearby contact search request including information of a current location of the client terminal, which is obtained using a Location Based Service (LBS), and comprising a request for a list of nearby contacts comprising friends of a user of the client terminal;

searching for at least one communication robot within a target area, the target area corresponding to the current location of the client terminal, and providing a contact list including at least one friend of the user of the client terminal and the at least one communication robot to the client terminal, the at least one communication robot including the first communication robot;

receiving a query request for the first one communication robot from the client terminal, the query request comprising an interaction with the first communication robot in a chat setting, the first communication robot being selected from the contact list by the user of the client terminal for interaction;

obtaining recommendation information corresponding to the query request; and pushing the recommendation information to the client terminal;

wherein searching for at least one communication robot around the current location of the client terminal includes:

searching for all communication robots within the target area, and determining the effective range of the first communication robot of the communication robots within the target area;

determining whether the current location of the client terminal is within the effective range of the first communication robot;

if the current location of the client terminal is within the effective range of the first communication robot, determining the first communication robot as one of the at least one communication robot.

11. The non-transitory computer readable storage medium of claim 10, wherein a type of the query request is an auto-response type; and obtaining the recommendation information corresponding to the query request comprises:

searching a preconfigured relationship between query requests and items of recommendation information for the recommendation information corresponding to the query request.

12. The non-transitory computer readable storage medium of claim 10, wherein a type of the query request is a short-term information type; and obtaining the recommendation information corresponding to the query request comprises:

according to an identity of the communication robot in the query request, searching a preconfigured relationship between identities of communication robots and information link addresses of short-term information for an information link address corresponding to the identity of the communication robot; taking the information link address as the recommendation information corresponding to the query request.

13. The non-transitory computer readable storage medium of claim 12, wherein the computer program codes, when executed by a computer at a client terminal side, will cause the computer at the client terminal side to obtain a web page corresponding to the information link address from a network side, and display the web page.

14. The non-transitory computer readable storage medium of claim 10, wherein a type of the query request is a real-time information type; and obtaining the recommendation information corresponding to the query request comprises:

sending the query request to a preconfigured client terminal or server, receiving recommendation information sent by the preconfigured client terminal or server, and taking the received recommendation information as the recommendation information corresponding to the query request.

* * * * *